(12) United States Patent
Isoda et al.

(10) Patent No.: US 11,898,621 B2
(45) Date of Patent: Feb. 13, 2024

(54) WIRE GUIDE DEVICE HAVING LINK MEMBERS SURROUNDING WIRE

(71) Applicant: SUMITOMO WIRING SYSTEMS, LTD., Mie (JP)

(72) Inventors: Kazuma Isoda, Mie (JP); Hiroki Uno, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 451 days.

(21) Appl. No.: 17/183,591

(22) Filed: Feb. 24, 2021

(65) Prior Publication Data

US 2021/0285518 A1    Sep. 16, 2021

(30) Foreign Application Priority Data

Mar. 13, 2020  (JP) ................................. 2020-043858

(51) Int. Cl.
*F16G 13/16*    (2006.01)

(52) U.S. Cl.
CPC ................................ *F16G 13/16* (2013.01)

(58) Field of Classification Search
CPC ..... H02G 3/0608; H02G 3/0437; F16G 13/16
USPC ........................................................ 248/70
See application file for complete search history.

(56) References Cited

U.S. PATENT DOCUMENTS

| | | | | |
|---|---|---|---|---|
| 6,992,254 B2 * | 1/2006 | Komiya | ............... | H02G 11/006 248/51 |
| 7,520,122 B2 * | 4/2009 | Kitagawa | ............. | H02G 3/0475 59/900 |
| 8,674,222 B2 * | 3/2014 | Hsieh | ...................... | F16L 3/015 174/68.2 |
| 9,841,079 B2 | 12/2017 | Komiya | | |
| 2004/0083709 A1 * | 5/2004 | Ikeda | ................... | H02G 11/006 59/78.1 |
| 2011/0185697 A1 * | 8/2011 | Egami | ..................... | F16G 13/16 59/78.1 |
| 2012/0304616 A1 * | 12/2012 | Wendig | ................ | H02G 11/006 59/78.1 |

* cited by examiner

*Primary Examiner* — Timothy J Thompson
*Assistant Examiner* — Michael F McAllister
(74) *Attorney, Agent, or Firm* — Venjuris, P.C.

(57) ABSTRACT

A wire guide device A includes a wire guide body 15 that is formed by coupling a plurality of link members 17 in series such that the link members 17 can rotate relative to each other, and inside which an accommodation space 16 for a wire W is formed. The link member 17 includes a link body 20 and a lid 31. The link body 20 is provided with an opening 29 through which the accommodation space 16 is open toward the outside of the wire guide body 15. The lid 31 is locked to the link body 20 and thereby closes the opening 29. The openings 29 and the lids 31 are arranged on surfaces of the link members 17 that are located on an inner side of a curved portion of the wire guide body 15 when the wire guide body 15 is curved.

5 Claims, 6 Drawing Sheets

WIRE GUIDE DEVICE HAVING LINK MEMBERS SURROUNDING WIRE

CROSS-REFERENCE TO RELATED APPLICATIONS

This application is based on and claims priority from Japanese Patent Application No. 2020-043858, filed on Mar. 13, 2020, with the Japan Patent Office, the disclosure of which is incorporated herein in their entireties by reference.

TECHNICAL FIELD

The present disclosure relates to a wire guide device.

BACKGROUND

Japanese Patent Laid-open Publication No. 2016-035273 discloses a cable protection-guide device obtained by coupling a plurality of links in series such that the links can pivot relative to each other. Each link includes two link portions coupled by a second arm, and a first arm extending from one of the link portions in the form of a cantilever. When the extending end of the first arm is locked to the other link portion, an accommodation space surrounded by the two link portions, the second arm, and the first arm is formed. The first arms of the links are arranged so as to be lined up in series in the longitudinal direction of the cable protection-guide device. When cables are accommodated in the accommodation spaces, the accommodation spaces are opened in the form of a groove extending in the longitudinal direction of the cable protection-guide device by releasing the first arms. This improves the workability of accommodating the cables in the accommodation spaces.

SUMMARY

The cable protection-guide device is deformed and curved due to the relative displacement of members connected to the two end portions of the cable protection-guide device. At this time, the cables accommodated in the accommodation spaces are pressed by the links from the outer side of the curved portion and are thus elastically curved, and therefore, an elastic reaction force is applied to portions of the links that are located on the outer side of the curved portion. Since the first arms that can be released and attached are arranged on the portions of the links that are located on the outer side of the curved portion, there is a risk that the first arms are displaced and released due to the reaction force from the cables, and thus portions of the cables protrude from the links. If the cables protrude from the links, the cable guide function will be impaired.

A wire guide device of the present disclosure was accomplished based on the above-mentioned circumstances, and the object thereof is to provide a wire guide device that has a guide function with excellent reliability.

A wire guide device of the present disclosure includes a wire guide body that is formed by coupling a plurality of link members in series, the link members being capable of rotating relative to each other, and inside which an accommodation space for a wire is formed, wherein the link member includes a link body and a lid, the link body is provided with an opening through which the accommodation space is open toward the outside of the wire guide body, the lid is locked to the link body and thereby closes the opening, and the openings and the lids are arranged on surfaces of the link members that are located on an inner side of a curved portion of the wire guide body when the wire guide body is curved.

The wire guide device of the present disclosure has a guide function with excellent reliability.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
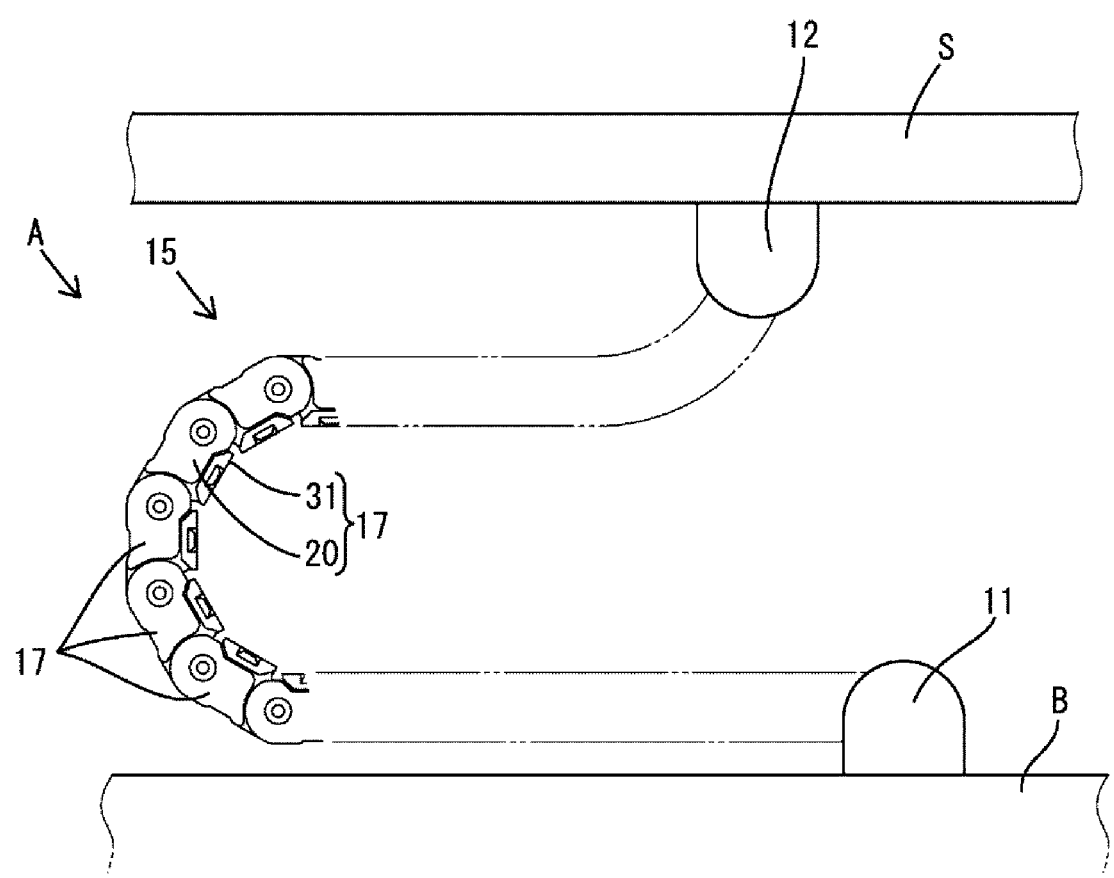
FIG. 1 is a plan view of a wire guide device of Embodiment 1.
Figure 2:
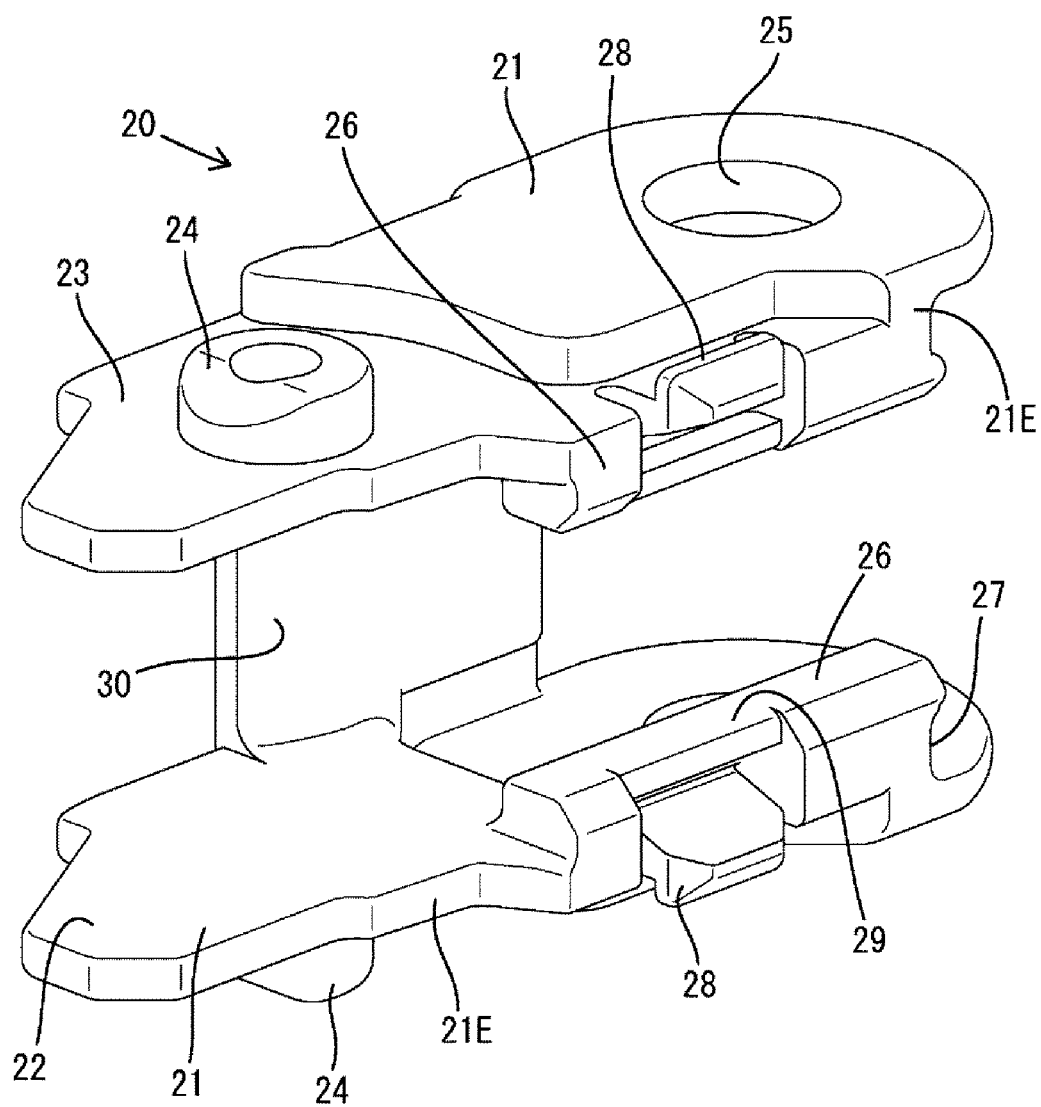
FIG. 2 is a perspective view of a link body that is a part of a link member.
Figure 3:
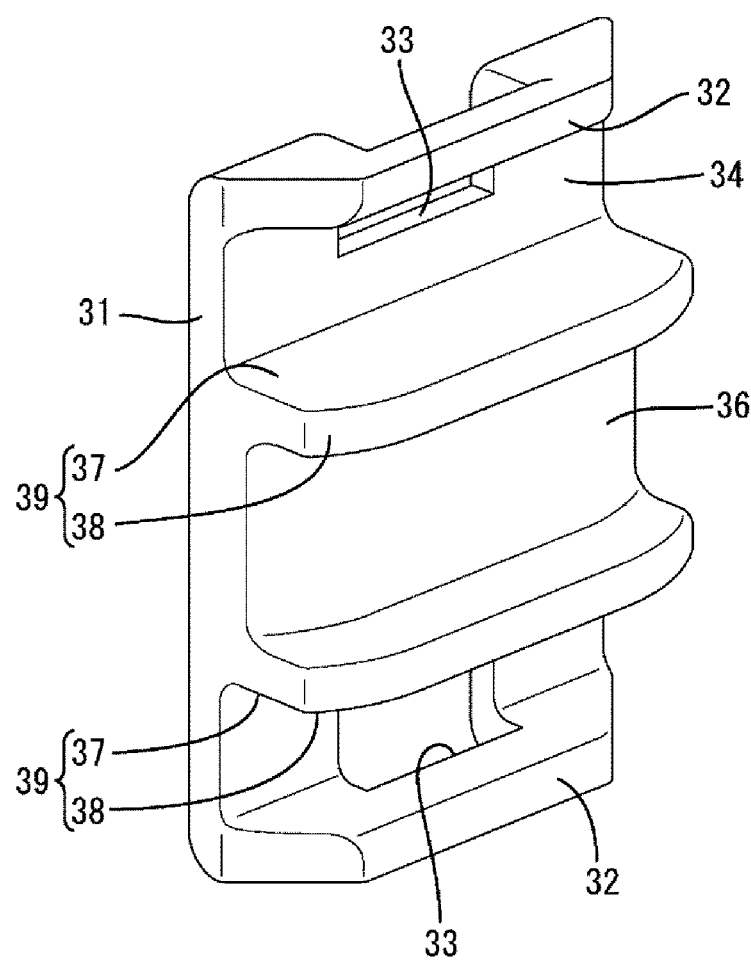
FIG. 3 is a perspective view of a lid that is a part of the link member.
Figure 4:
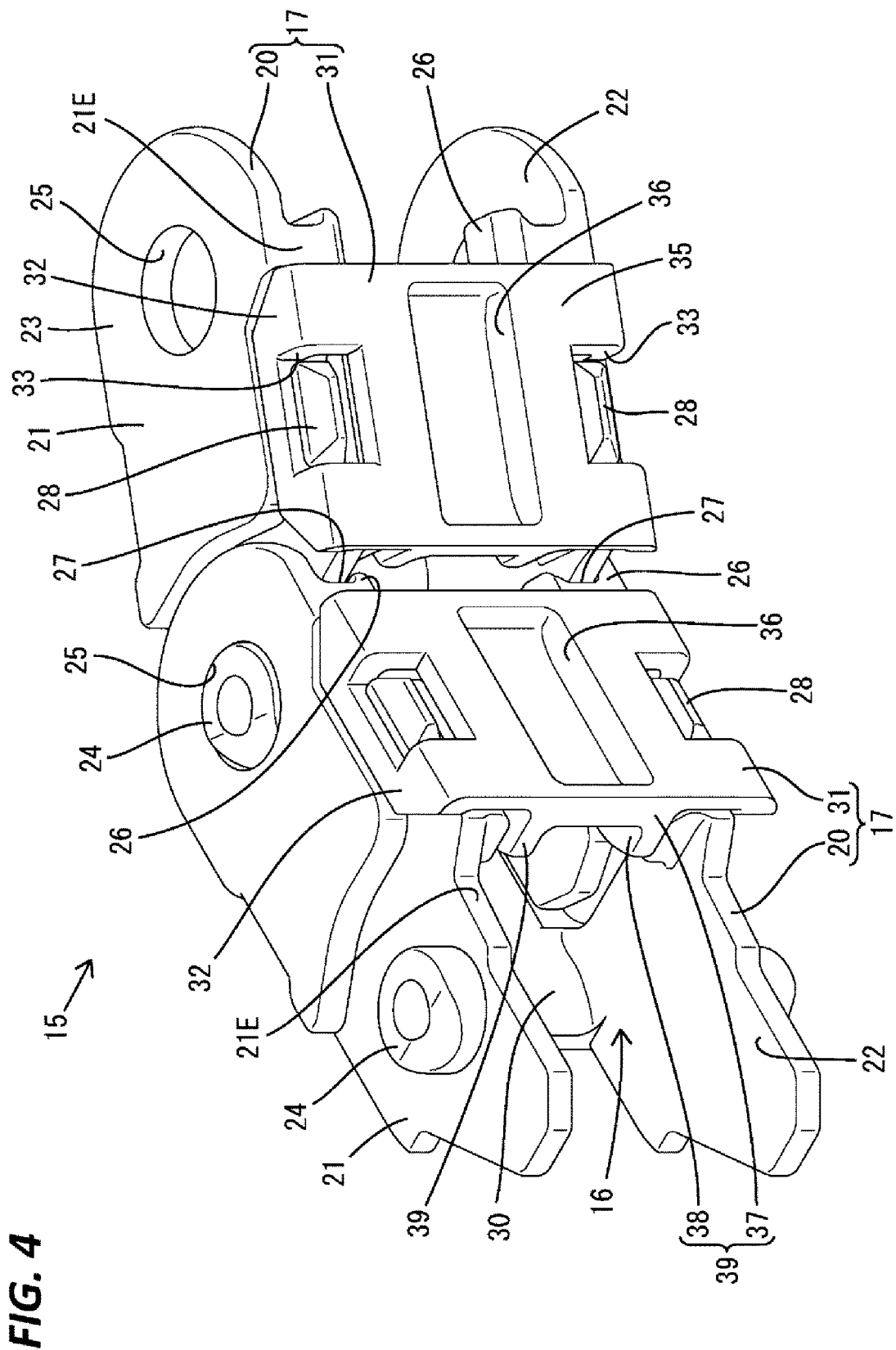
FIG. 4 is a perspective view showing a state in which two link members are coupled.
Figure 5:
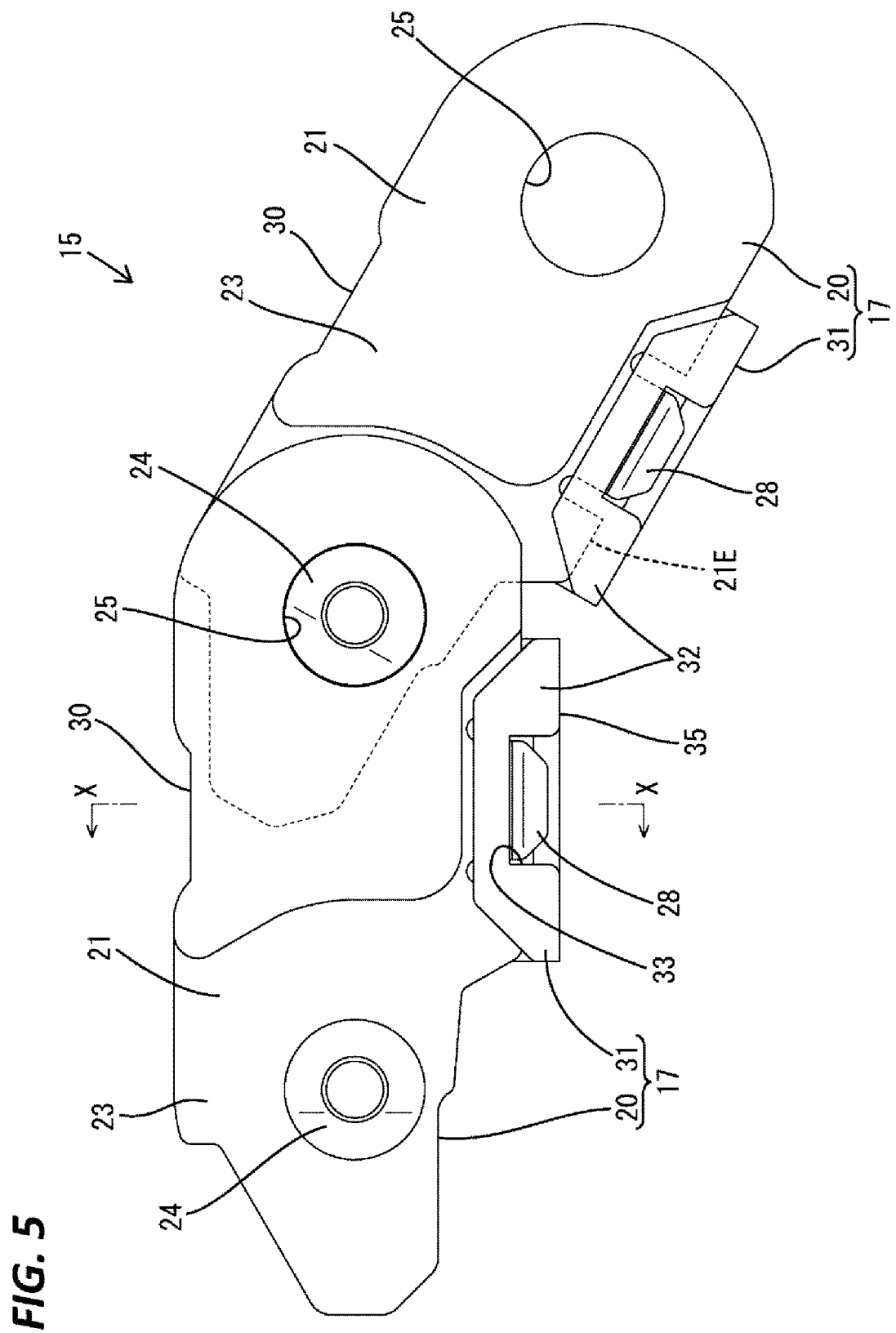
FIG. 5 is a plan view showing a state in which two link members are coupled.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of the Present Disclosure

First, embodiments of the present disclosure will be listed and described.

(1) A wire guide device of the present disclosure is a wire guide device including a wire guide body that is formed by coupling a plurality of link members in series, the link members being capable of rotating relative to each other, and inside which an accommodation space for a wire is formed, wherein the link member includes a link body and a lid, the link body is provided with an opening through which the accommodation space is open toward the outside of the wire guide body, the lid is locked to the link body and thereby closes the opening, and the openings and the lids are arranged on surfaces of the link members that are located on an inner side of a curved portion of the wire guide body when the wire guide body is curved.

With the configuration of the present disclosure, when the wire guide body is deformed and curved, the wire accommodated in the accommodation space is pressed by the link bodies from the outer side of the curved portion and is thus elastically curved. At this time, a reaction force from the wire is not applied to the lids located on the inner side of the curved portion, and therefore, there is no risk of the lids dislodging from the link bodies. If the lids dislodge and the wire protrudes from the wire guide body, the guide function of the wire guide body will be impaired. However, with the present disclosure, there is no risk of the lids dislodging, and therefore, the guide function with excellent reliability can be achieved.

(2) It is preferable that, when the radius of curvature of the curved wire guide body is the smallest, the adjacent lids are not in contact with each other. With this configuration, it is possible to prevent the lids from dislodging due to interference between the adjacent lids.

(3) It is preferable that the link body includes two opposed portions that are arranged opposed to each other with the accommodation space being located therebetween, and a base portion that is coupled to and supports the two opposed portions, and the lid includes locking portions and receiving portions, the locking portions overlap the outer surfaces of the opposed portions, and each of the opposed portion is located between the receiving portion and the locking portion. With this configuration, when the locking portion is about to separate from the outer surface of the opposed portion, the receiving portion interferes with the inner surface of the opposed portion, and therefore, the locking portion is less likely to separate from the outer surface of the opposed portion. Accordingly, the lids can be reliably locked to the link bodies.

(4) In the configuration described in (3), it is preferable that the lid is provided with a step portion formed by recessing the outer side surface of the lid and protruding the inner side surface of the lid, and the receiving portion includes a first supporting portion serving as a portion of the step portion, and a second supporting portion protruding from the inner side surface of the step portion. With this configuration, it is possible to increase the size of the receiving portion without needlessly increasing the thickness of the lid.

(5) In the configuration described in (3) or (4), it is preferable that the adjacent link bodies are coupled to each other by stacking the opposed portions of one of the adjacent link bodies on the opposed portions of the other link body in a vertical direction and fitting shaft portions whose axes extend in the vertical direction to bearing holes, groove-like fitting portions are formed in order to fit outer edge portions of the opposed portions of the other link body to the opposed portions of the one link body, and the groove-like fitting portion is located between the locking portion and the receiving portion in a vertical direction. With this configuration, there is no risk that the opposed portions of the adjacent link bodies are displaced in the vertical direction relative to each other, and therefore, a state is maintained in which a fitting allowance for the shaft portion and the bearing hole is sufficiently secured. Accordingly, it is possible to prevent the coupling between the adjacent link members from being released.

Details of Embodiment of the Present Disclosure

Embodiment 1

Hereinafter, Embodiment 1 in which a wire guide device A of the present disclosure is embodied will be described with reference to FIGS. 1 to 6. It should be noted that the present invention is not limited to these embodiments and is defined by the scope of the appended claims, and all changes that fall within the same essential spirit as the scope of the claims are intended to be included therein. In Embodiment 1, as for the vertical direction, the upper side and the lower side shown in FIGS. 2 to 4 and 6 are defined as the upper side and the lower side as-is.

As shown in FIG. 1, the wire guide device A of Embodiment 1 includes a body-side bracket 11 attached to a body B, a door-side bracket 12 attached to a sliding door S, and a wire guide body 15, and has an elongated shape as a whole. The wire guide device A is routed between the body B and the sliding door S in an automobile. A wire harness H (see FIG. 6) that bundles a plurality of wires W is accommodated in the wire guide device A. During the process in which the sliding door S opens and closes the door opening of the body B, the wire guide device A guides the wire harness H such that the wire harness H is deformed and curved without interference with the body B and the sliding door S.

Figure 6:
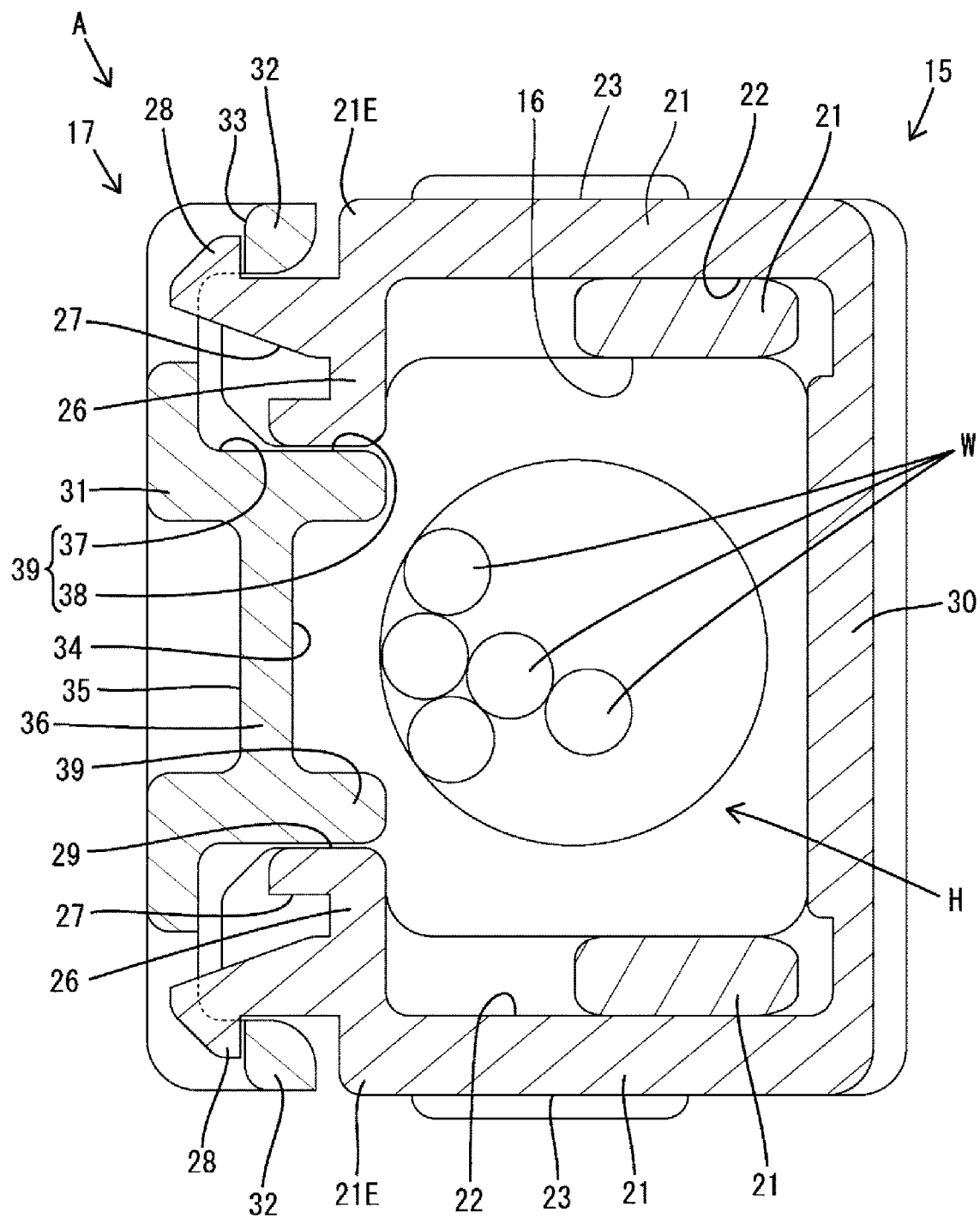
FIG. 6 is a cross-sectional view taken along line X-X in FIG. 5.

The wire guide body 15 has an elongated shape, and can be deformed and curved in a horizontal plane. As shown in FIG. 6, an elongated accommodation space 16 extending in the longitudinal direction of the wire guide body 15 is formed inside the wire guide body 15. The two end portions of the wire guide body 15 are respectively coupled to the body-side bracket 11 and the door-side bracket 12. The wire harness H is passed through the accommodation space 16, the body-side bracket 11, and the door-side bracket 12. The wire guide body 15 is obtained by coupling a plurality of link members 17 having a polygonal tube shape in series such that the link members 17 are rotatable relative to each other about a shaft portion 24 extending in the vertical direction.

One link member 17 is formed by attaching one lid 31 made of a synthetic resin to one link body 20 made of a synthetic resin, and has a polygonal tube shape as a whole. The link body 20 includes two opposed portions 21 that are symmetrical in the vertical direction, and a base portion 30 that is coupled to and supports the opposed portions 21. The base portion 30 has a square plate shape whose thickness direction extends in the horizontal direction.

Each of the two opposed portions 21 has a horizontal plate shape as a whole. The opposed portions 21 protrude from the upper edge portion and the lower edge portion of the base portion 30 and are opposed to each other. One of the two side edge portions in the longitudinal direction of the opposed portion B 21 is continuous with the base portion 30 at a right angle. A side edge portion of the two side edge portions of the opposed portion 21 that is located on a side opposite to the side edge portion continuous with the base portion 30 is defined as a protruding edge portion 21E. A surface of the opposed portion 21 that is opposed to the partner opposed portion 21 is defined as an inner surface 22. A surface of the opposed portion 21 that is located on a side opposite to the partner opposed portion 21 is defined as an outer surface 23.

The inner surface 22 of the opposed portion 21 has a step-like shape in which a portion on one side in the longitudinal direction protrudes relative to the inner surface 22 of a portion on the other side. The outer surface 23 of the opposed portion 21 has a step-like shape in which a portion on one side in the longitudinal direction is recessed relative to the outer surface 23 of a portion on the other side. A shaft portion 24 having a protruding shape is formed on the outer surface 23 at one end portion in the longitudinal direction of the opposed portion 21. A bearing hole 25 that passes through the opposed portion 21 in the vertical direction is formed at the other end portion in the longitudinal direction of the opposed portion 21.

A thick portion 26 that protrudes toward the partner opposed portion 21 is formed on the inner surface 22 of the protruding edge portion 21E of the opposed portion 21. A groove-like fitting portion 27 is formed at an end portion of the thick portion 26 on the bearing hole 25 side in the longitudinal direction. A locking protrusion 28 is formed on the outer surface 23 of the protruding edge portion 21E of the opposed portion 21.

The adjacent link bodies 20 are coupled to each other by fitting the shaft portions 24 into the bearing holes 25. The elongated accommodation space 16 extending in the longitudinal direction of the wire guide body 15 is formed inside a plurality of link bodies 20 that are coupled to each other. In the state in which the lids 31 are not attached, the accommodation space 16 is open through elongated openings 29 extending in the longitudinal direction of the wire guide body 15 in a side surface of the wire guide body 15. In the wire guide body 15 that is deformed and curved due to the sliding door S being opened and closed, the openings 29 are open on the inner side of the curved portion of the curved wire guide body 15.

Each of the lids 31 has a plate shape as a whole, and has a rectangular shape in a side view in which the link member 17 is viewed from the lateral side. A plurality of lids 31 are individually attached to a plurality of link bodies 20 so as to close the openings 29. Locking portions 32 that protrude toward the link bodies 20 are provided at the two end portions in the vertical direction of the lid 31. Each of the locking portions 32 is provided with a locking hole 33. A side surface of the lid 31 that faces the opening 29 is defined as an inner side surface 34. A side surface of the lid 31 that is located on a side opposite to the opening 29 is defined as an outer side surface 35.

In a region between the upper and lower locking portions 32 in the lid 31, a step portion 36 is formed by recessing the outer side surface 35 and protruding the inner side surface 34. Portions of the inner side surface 34 of the lid 31 that are located at the upper edge portion and the lower edge portion of the step portion 36 function as first supporting portions 37 that are configured to protrude into the opening 29. The upper edge portion and the lower edge portion of the step portion 36 are provided with second supporting portions 38 that are configured to horizontally protrude into the opening 29 from the first supporting portions 37. The first supporting portion 37 and the second supporting portion 38 that are located on the upper side are continuous with each other at the same height and form one receiving portion 39.

The following describes the assembly of the wire guide device A and a procedure of attaching the wire harness H to the wire guide device A. A plurality of link bodies 20 are coupled to each other before the lids 31 are attached to the link bodies 20. The elongated accommodation space 16 for accommodating the wire harness H is formed inside the coupled link bodies 20. The accommodation space 16 is open toward the outside of the wire guide body 15 through the openings 29 that are continuous with each other over the entire length of the wire guide body 15.

After the link bodies 20 are coupled, the wire harness H is accommodated in the accommodation space 16 through the openings 29. After the wire harness H is accommodated in the accommodation space 16, the lids 31 are attached to the link bodies 20. When the lid 31 is attached thereto, the lid 31 is elastically deformed such that the upper and the lower locking portions 32 are expanded, and then the locking holes 33 are locked to the locking protrusions 28. The lids 31 are attached to the link bodies 20 and are held in this state due to the locking holes 33 and the locking protrusions 28 being locked. The openings 29 are closed by attaching the lids 31 to the link bodies 20, and the attachment of the wire harness H to the wire guide body 15 is completed at the same time as the completion of the assembly of the wire guide body 15.

In the state in which the lids 31 are attached to the link bodies 20, the locking portions 32 are located on the outer surfaces 23 of the protruding edge portions 21E of the opposed portions 21, and the receiving portions 39 are located on the inner surfaces 22 of the protruding edge portions 21E (thick portions 26) of the opposed portions 21. In other words, the protruding edge portion 21E (thick portion 26) of the opposed portion 21 is located between the locking portion 32 and the receiving portion 39 in the vertical direction. Even when the opposed portion 21 is about to be deformed toward the outer surface 23 side, the locking portion 32 presses down the protruding edge portion 21E, and thus the opposed portion 21 is prevented from being deformed toward the outer surface 23 side. Even when the opposed portion 21 is about to be deformed toward the inner surface 22 side, the opposed portion 21 is prevented from being deformed toward the inner surface 22 side since the protruding edge portion 21E abuts against the receiving portion 39.

When the sliding door S is opened, there is a concern that a person getting on and off a vehicle may accidentally step on the wire guide body 15 and thus the coupling between the adjacent link members 17 may be released due to deformation of the link bodies 20. However, the locking portions 32 and the receiving portions 39 formed on the lid 31 as mentioned above prevent the two opposed portions 21 from being deformed such that they are separated from each other or they come close to each other. Accordingly, there is no risk that the coupling between the link bodies 20 (link members 17) is released.

The wire guide device A of Embodiment 1 includes the wire guide body 15, the body-side bracket 11, and the door-side bracket 12. The wire guide body 15 is formed by coupling a plurality of link members 17 in series such that the link members 17 are rotatable relative to each other. The accommodation space 16 for accommodating the wire harness H (a plurality of wires W) is formed inside the wire guide body 15. Each of the link members 17 includes the link body 20 and the lid 31. The openings 29 through which the accommodation space 16 is open toward the outside of the wire guide body 15 are provided to the link bodies 20. The lids 31 are locked to the link bodies 20 and thus close the openings 29.

During the process in which the sliding door S is opened and closed, the wire guide body 15 is deformed and curved in a plan view. When the wire guide body 15 is deformed and curved, the wire harness H accommodated in the accommodation space 16 is pressed by the base portions 30 of the link bodies 20 from the outer side of the curved portion, and is thus elastically deformed and curved. If a reaction force from the wire harness H is applied to the lids 31, the lids 31 will dislodge from the link bodies 20, the wire harness H protrudes from the wire guide body 15, and the guide function of the wire guide device A will be impaired.

In view of this point, the wire guide body 15 (including the link members 17) is provided with the openings 29 and the lids 31 on only a surface of the wire guide body 15 (including the link members 17) that is located on the inner side of a curved portion of the wire guide body 15 when the wire guide body 15 is curved. The reaction force generated by the wire harness H that is elastically deformed and curved is not applied to the lids 31 located on the inner side of the curved portion. Accordingly, there is no risk of the lids 31 dislodging from the link bodies 20.

As the radius of curvature of the curved wire guide body 15 decreases, regions on the shaft portion 24 side of the protruding edge portions 21E of the opposed portions 21 are fitted into and abut against the groove-like fitting portions 27. At this time, the radius of curvature of the wire guide body 15 is the smallest. In the state in which the radius of curvature of the wire guide body 15 is the smallest, the adjacent lids 31 are not in contact with each other. Accordingly, there is no risk of the lids 31 dislodging from the link bodies 20 due to interference between the lids 31. With the wire guide device A of Embodiment 1, a guide function of guiding the wire harness H with excellent reliability is achieved since there is no risk of the lids 31 dislodging from the link bodies 20 during the process in which the wire guide body 15 is deformed and curved.

The link body 20 includes the two opposed portions 21 that are arranged so as to be opposed to each other with the accommodation space 16 being located therebetween, and the base portion 30 that is coupled to and supports the two opposed portions 21. The lid 31 includes the locking portions 32 and the receiving portions 39, the locking portions 32 overlap the outer surfaces 23 of the opposed portions 21, and each of the protruding edge portions 21E of the opposed portions 21 is located between the receiving portion 39 and the locking portion 32. When the locking portions 32 are about to separate from the outer surfaces 23 of the opposed portions 21, the receiving portions 39 interfere with the inner surfaces 22 of the opposed portions 21, and thus the locking portions 32 are less likely to separate from the outer surfaces 23 of the opposed portions 21. Accordingly, the lids 31 can be reliably locked to the link bodies 20.

The lid 31 is provided with the step portion 36 formed by recessing the outer side surface 35 of the lid 31 and protruding the inner side surface 34 of the lid 31. The receiving portion 39 includes the first supporting portion 37 and the second supporting portion 38. The first supporting portion 37 serves as a portion of the step portion 36. The receiving portion 39 includes the second supporting portion 38 that protrudes from the inner side surface 34 (first supporting portion 37) of the step portion 36 and is continuous with the first supporting portion 37. With this configuration, it is possible to increase the size of the receiving portion 39 in a direction in which the opposed portions 21 protrude from the base portion 30, without needlessly increasing the thickness of the lid 31.

The adjacent link bodies 20 are coupled to each other by stacking the opposed portions 21 of one of the adjacent link bodies 20 on the opposed portions 21 of the other link body 20 in the vertical direction and fitting the shaft portions 24 whose axes extend in the vertical direction to the bearing holes 25. If the wire guide body 15 is stepped on, or a bending force is further applied to the wire guide body 15 in the state in which the radius of curvature of the wire guide body 15 is the smallest, the opposed portions 21 of the adjacent link bodies 20 are inclined to each other. In such cases, there is a concern that a fitting allowance for the shaft portion 24 and the bearing hole 25 will decrease, and the shaft portion 24 will separate from the bearing hole 25.

As a measure taken against such a problem, the groove-like fitting portions 27 are formed in order to fit the outer edge portions (protruding edge portions 21E) of the opposed portions 21 of one of the adjacent link bodies 20 to the opposed portions 21 of the other link body 20, and each of the groove-like fitting portions 27 is located between the locking portion 32 and the receiving portion 39 in the vertical direction. With this configuration, there is no risk that the opposed portions 21 of the adjacent link bodies 20 are displaced in the vertical direction relative to each other, and therefore, a state is maintained in which a fitting allowance for the shaft portion 24 and the bearing hole 25 is sufficiently secured. Accordingly, it is possible to prevent the coupling between the adjacent link members 17 from being released.

Other Embodiments

The present invention is not limited to the embodiment described in the description above and the drawings, and is defined by the scope of the appended claims. All changes that fall within the same essential spirit as the scope of the claims are included in the present invention, and the following embodiments are also intended to be included therein.

Although, in the above-mentioned embodiment, the adjacent lids are not in contact with each other when the radius of curvature of the curved wire guide body is the smallest, the adjacent lids may be in contact with each other when the radius of curvature of the curved wire guide body is the smallest.

Although the lid and the link body are formed in one piece in the above-mentioned embodiment, the lid may be a part separate from the link body.

Although, in the above-mentioned embodiment, the lid includes the receiving portions that are configured such that the opposed portion is to be located between the receiving portion and the locking portion, the lid may include no receiving portions.

Although the lid includes the step portion in the above-mentioned embodiment, the lid may include no step portion. In this case, the receiving portion is constituted by only a portion protruding from the inner surface of the lid.

Although the two opposed portions are provided with the groove-like fitting portions to which the outer edge portions of the adjacent opposed portions are to be fitted in the above-mentioned embodiment, the opposed portions may be provided with no groove-like fitting portions.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A wire guide device comprising,
a wire guide body that is formed by coupling a plurality of link members in series, the link members being capable of rotating relative to each other, and an accommodation space for a wire that is formed inside the wire guide body,
wherein the link member includes a link body and a lid,
the link body is provided with an opening through which the accommodation space is open toward the outside of the wire guide body,
the lid is locked to the link body and thereby closes the opening,
the openings and the lids are arranged on surfaces of the link members that are located on an inner side of a curved portion of the wire guide body when the wire guide body is curved,
the link body includes two opposed portions that are arranged opposed to each other with the accommodation space being located therebetween, and
the lid includes locking portions and receiving portions positioned between the locking portions, the locking portions overlap outer surfaces of each the opposed portions and the receiving portions overlap inner surfaces of each of the opposed portions.

2. The wire guide device according to claim 1, wherein, when the radius of curvature of the curved wire guide body is the smallest, the adjacent lids are not in contact with each other.

3. The wire guide device according to claim 1,
wherein the link body includes a base portion that is coupled to and supports the two opposed portions.

4. The wire guide device according to claim 3,
wherein the lid is provided with a step portion formed by recessing the outer side surface of the lid and protruding the inner side surface of the lid, and
the receiving portion includes a first supporting portion serving as a portion of the step portion, and a second supporting portion protruding from the inner side surface of the step portion.

5. The wire guide device according to claim 3,
wherein the adjacent link bodies are coupled to each other by stacking the opposed portions of one of the adjacent link bodies on the opposed portions of the other link body in a vertical direction and fitting shaft portions whose axes extend in the vertical direction to bearing holes,
groove-like fitting portions are formed in order to fit outer edge portions of the opposed portions of the other link body to the opposed portions of the one link body, and
the groove-like fitting portion is located between the locking portion and the receiving portion in a vertical direction.

* * * * *